H. W. LLOYD.
CLUTCH.
APPLICATION FILED APR. 23, 1910.

974,086.

Patented Oct. 25, 1910.

WITNESSES
H. J. Walker
C. W. Fairbank

INVENTOR
Harry William Lloyd
BY
ATTORNEYS

UNITED STATES PATENT OFFICE.

HARRY WILLIAM LLOYD, OF JACKSONVILLE, FLORIDA.

CLUTCH.

974,086.  Specification of Letters Patent.  Patented Oct. 25, 1910.

Application filed April 23, 1910.  Serial No. 557,154.

*To all whom it may concern:*

Be it known that I, HARRY WILLIAM LLOYD, a citizen of the United States, and a resident of Jacksonville, in the county of Duval and State of Florida, have invented a new and Improved Clutch, of which the following is a full, clear, and exact description.

This invention relates to certain improvements in clutches, for transmitting rotary motion from a driving to a driven shaft, and the special object of the invention is to so construct the parts that the driven shaft may be given any desired speed less than or equal to that of the driving shaft, without the aid of intermeshing gears and without any break or interruption in changing from one speed to another. In my improved clutch, there is provided a chamber within which a liquid is confined, said liquid being caused to circulate when the driven member is rotated at any speed below that of the driving member. By controlling the rate of flow of the liquid, the relative speeds may be varied at will.

Reference is to be had to the accompanying drawings, forming a part of this specification, in which similar characters of reference indicate corresponding parts in both the figures, and in which—

Figure 1:
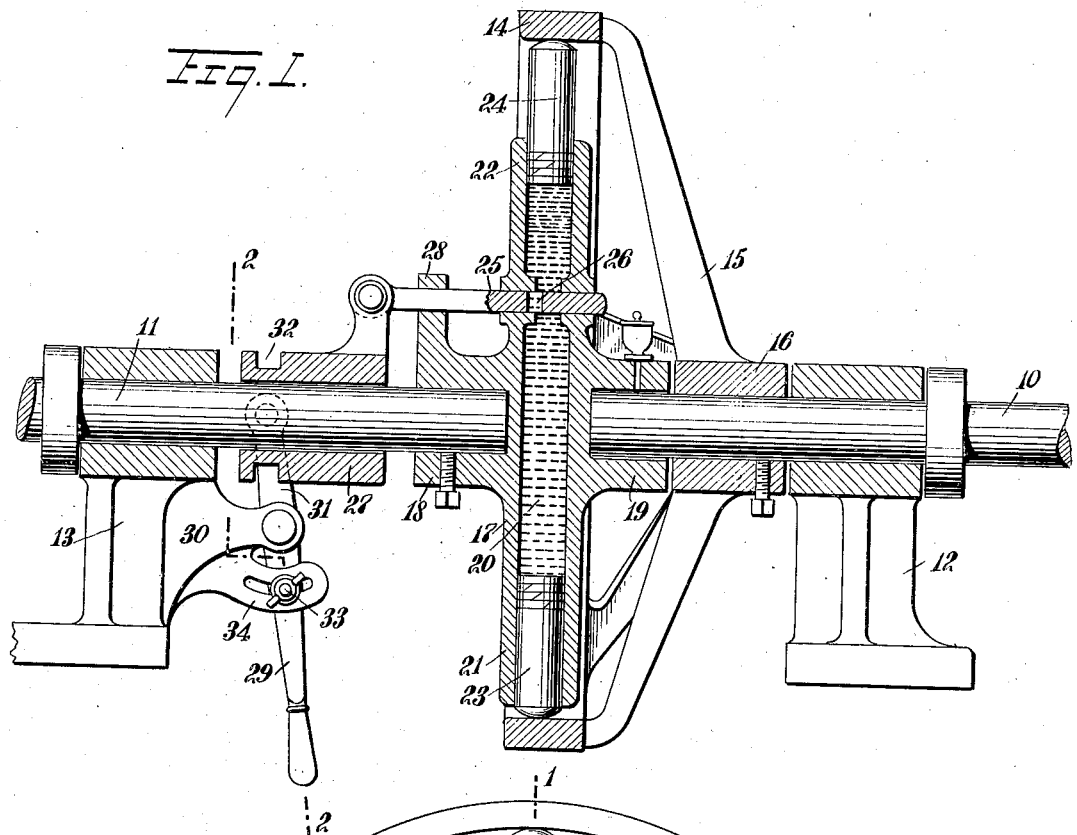
Figure 2:
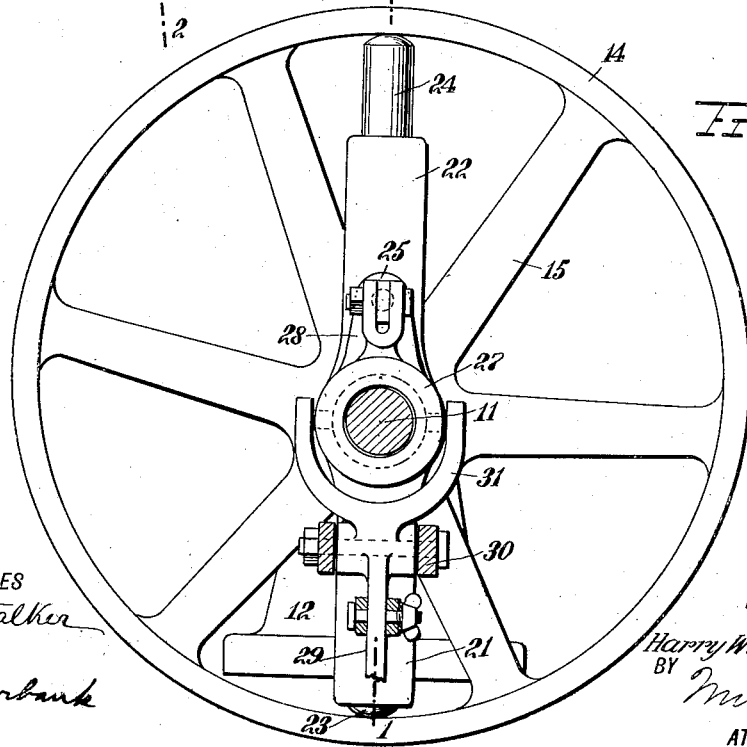

Figure 1 is a longitudinal section through a clutch constructed in accordance with my invention, said section being taken on the line 1—1 of Fig. 2; and Fig. 2 is an end view of the clutch, a part of the mechanism being shown in section on the line 2—2 of Fig. 1.

My improved clutch is adapted for use in connecting any form of rotary driving member to a rotary driven member, and may, if desired, be used as a brake; that is, if the driven member is rigidly held so that it cannot rotate, then the throwing in of the clutch will operate as a brake to retard or positively stop the driving member. One form of my clutch is illustrated in the drawings as connecting two shafts 10 and 11, in alinement with each other and supported in bearings 12 and 13. One of these shafts constitutes the driving shaft and the other the driven shaft, and as far as the action of the clutch is concerned, either shaft may operate as the driving shaft and the other as the driven shaft. To simplify the description, the shaft 10 will hereinafter be referred to as the "driving shaft" and the shaft 11 as the "driven shaft". The driving shaft 10 carries a clutch member in the form of a wheel or pulley having a circular peripheral rim portion 14, eccentrically mounted in respect to the shaft. This rim is rigidly secured to the shaft in any suitable manner, as, for instance, by a plurality of spokes 15 and a hub 16. The hub is rigidly secured to the shaft and the spokes are of different lengths, so as to give the rim the desired eccentricity in respect to the shaft. The rim portion 14 of the clutch member is overhanging and is provided with a smooth inner cylindrical surface. The other clutch member is in the form of a casing 17, disposed within the rim and having a hub portion 18 rigidly secured to the driven shaft and having a hub portion 19 rotatably mounted on the driving shaft. The casing 17 has a chamber 20 therein, adapted to contain oil or other substantially non-compressible liquid, and the terminal portions of the chamber are in the form of cylinders 21 and 22. Within these two cylinders are two pistons or plungers 23 and 24, constituting the outer ends of the cylinders and free to move longitudinally. As the space between the two pistons is completely filled by the liquid, it is evident that an inward movement of one piston can be secured only upon the outward movement of the opposite piston. The pistons are of such size and such a quantity of liquid is placed in the chamber, that the outer ends of the pistons come closely adjacent the inner surface of the rim 14. The outer ends of these pistons are preferably rounded and are free to move along the inner surface of the rim when one clutch member rotates in respect to the other.

With the casing 17 stationary and with the clutch member rotating, it is evident that when the portion of the rim 14 nearest the center of the driving shaft is at the position indicated in the drawings, the piston 23 will be forced inwardly to the limiting extent, and the piston 24 will be forced outwardly to the limiting extent. After the driving member rotates through a half revolution, the short radius of the driving member comes adjacent the piston 24, and the latter will be gradually forced inwardly, and the piston 23 will move outwardly to a corresponding extent. Thus, as the driving member rotates, the pistons will be caused to reciprocate within their corresponding cylinders. If the piston be prevented from reciprocating, it is evident that the driving clutch member will then be unable to rotate in respect to the driven clutch member, and that the two will be compelled to rotate simultaneously. To prevent the reciprocation of the pistons, I provide a slide valve 25, adapted to subdivide the chamber 20 into two separate and distinct compartments. This slide valve has a passage 26 therethrough, by means of which one compartment of the chamber may communicate with the other when the valve is in one position. With the valve open, the pistons may freely reciprocate, as liquid may freely flow from one compartment to the other, but with the valve closed, there will be a definite and predetermined quantity of liquid in each compartment, and therefore neither piston can be forced inwardly, and the two clutch members will be prevented from relative rotation. Any suitable means may be provided for moving the valve. In the form illustrated, there is employed a sliding collar 27 on the driven shaft and connected to the slide valve. The valve moves through a guide 28, and the sliding collar is reciprocated by a lever 29, pivoted on a stationary bracket 30 and having a yoke 31 engaging in a groove 32 in the collar. The lever may be locked in position by a set screw 33 engaging in a segment 34. By moving the outer end of the lever or handle toward the clutch members, the valve 25 will be drawn out to an extent dependent upon the extent of movement of the lever, and the valve may be opened, closed or held in any intermediate position. By leaving the valve partially open, the flow of liquid will be retarded and the pistons may move, but not as freely as they would were the valve open. Thus, by varying the position of the valve and varying the rate of flow of the liquid, the relative movement of the driving member and the driven member may be controlled.

Having thus described my invention, I claim as new and desire to secure by Letters Patent:

1. A device of the class described, comprising two clutch members, one of said members having a chamber extending diametrically thereacross and having the opposite ends of the chamber constituting cylinders, a valve plate movable transversely across the said chamber intermediate the ends thereof and having an aperture for establishing communication between the cylinders when said valve plate is in a predetermined position, a radially-movable piston in each of said cylinders, and a second clutch member having an overhanging rim encircling said chambers and pistons and provided with an eccentrically-disposed surface in engagement with the outer ends of said pistons.

2. A device of the class described, comprising two shafts in alinement with each other and spaced apart, a clutch member between said shafts and having sockets in opposite sides thereof to receive the ends of said shafts, said member being rigidly secured to one of said shafts, a chamber extending diametrically through said member, a valve member for controlling communication between opposite ends of said chamber, pistons within said opposite ends, and a clutch member secured to the other of said shafts and having a rim encircling said first-mentioned member and pistons and presenting an eccentrically-disposed inner surface in engagement with the outer ends of the pistons.

In testimony whereof I have signed my name to this specification in the presence of two subscribing witnesses.

HARRY WILLIAM LLOYD.

Witnesses:
 HENRY B. BASSETT,
 J. HARRY GARDNER.